United States Patent [19]

Rypkema

[11] 4,395,734
[45] Jul. 26, 1983

[54] REMOTE MUTING FOR CATV/STV CONVERTERS

[75] Inventor: Jouke N. Rypkema, Lombard, Ill.

[73] Assignee: Zenith Radio Corporation, Glenview, Ill.

[21] Appl. No.: 257,074

[22] Filed: Apr. 24, 1981

[51] Int. Cl.³ .......................... H04N 7/16; H04N 7/12
[52] U.S. Cl. .................................. 358/194.1; 358/198; 358/86
[58] Field of Search .................... 455/1, 3, 4, 208, 212; 358/118, 121, 194.1, 198, 196, 160, 188, 904, 86

[56] References Cited

U.S. PATENT DOCUMENTS

| | | | |
|---|---|---|---|
| 3,202,758 | 8/1965 | Brownstein | 358/118 |
| 3,760,097 | 9/1973 | Burroughs | 455/1 |
| 3,896,262 | 7/1975 | Hudspeth | 455/1 |
| 4,039,954 | 8/1977 | den Toonder | 455/1 |
| 4,148,064 | 4/1979 | Reed | 455/1 |
| 4,317,214 | 2/1982 | Attinello | 455/1 |

Primary Examiner—Michael A. Wasinick
Attorney, Agent, or Firm—Jack Kail

[57] ABSTRACT

A television signal processing apparatus is responsive to a received television signal for translating the frequency spectrum thereof to a frequency band characterized by a fixed frequency carrier signal frequency modulated in accordance with a baseband audio signal. The frequency modulated carrier signal is combined with an unmodulated CW muting signal having a frequency approximately equal to the frequency of the carrier signal to facilitate remotely controlled muting of the baseband audio signal in accordance with the FM capture effect.

7 Claims, 5 Drawing Figures

REMOTE MUTING FOR CATV/STV CONVERTERS

BACKGROUND OF THE INVENTION

The present invention relates generally to radio frequency receivers including television receivers and ancillary signal translating devices such as cable television converters and, in particular, to a remotely controllable television signal tanslating device having a sound muting capability.

Television signal translating devices such as cable television converters and the like are operative for converting a received television signal from one RF frequency to another RF frequency compatible with the signal processing characteristics of a conventional television receiver. For example, a cable television converter is typically operated in response to a remotely generated tuning control signal for selectively converting one of a plurality of cable television channels to a channel 3 or 4 television signal which is then supplied to the antenna inputs of a television receiver. The signal translation process is normally accomplished by initially converting the received cable television signal to an IF frequency and then suitably re-converting the IF signal to the channel 3 or 4 RF carrier frequency.

While remote tuning of cable television converters is generally well known in the art, various other desirable remote control features, e.g. sound muting, have heretofore not been available. With particular reference to remotely controllable sound muting, this feature is typically provided in a conventional television receiver by suitably controlling a switch or the like for grounding or otherwise rendering the audio baseband signal developed at the output of an FM demodulator unavailable to the speakers of the television receiver. It will be appreciated that this technique is not applicable to a signal translating device such as a cable television converter since the audio signal is not developed in such devices in a baseband form. Although a remotely operated trap, either at the IF or RF audio frequency, can be used to remove the sound carrier in the converter, this approach suffers from the disadvantage that only random noise is coupled to the audio processing circuits of the television receiver from the cable converter whereby a clearly audible noisy signal is produced.

It is therefore a basic object of the present invention to provide an improved remotely controllable sound muting system for use in association with a radio frequency receiver such as a television signal processing apparatus.

It is a further object of the invention to provide a remotely controllable sound muting capability for a television signal translating device which is effective in the IF and RF frequency spectrums.

It is yet another object of the invention to provide a remotely controllable sound muting capability for a television signal translating device wherein a frequency translated television signal is produced for application to a television receiver in a form inhibiting the production of any sound, including noise, by the receiver.

BRIEF DESCRIPTION OF THE DRAWINGS

The features of this invention which are believed to be novel are set forth with particularity in the appended claims. The invention, together with its objects and the advantages thereof, may best be understood by reference to the following description taken in conjunction with the accompanying drawings, in which like reference numerals identify like elements in the several figures and in which:

DESCRIPTION OF THE PREFERRED EMBODIMENTS

Figure 1:
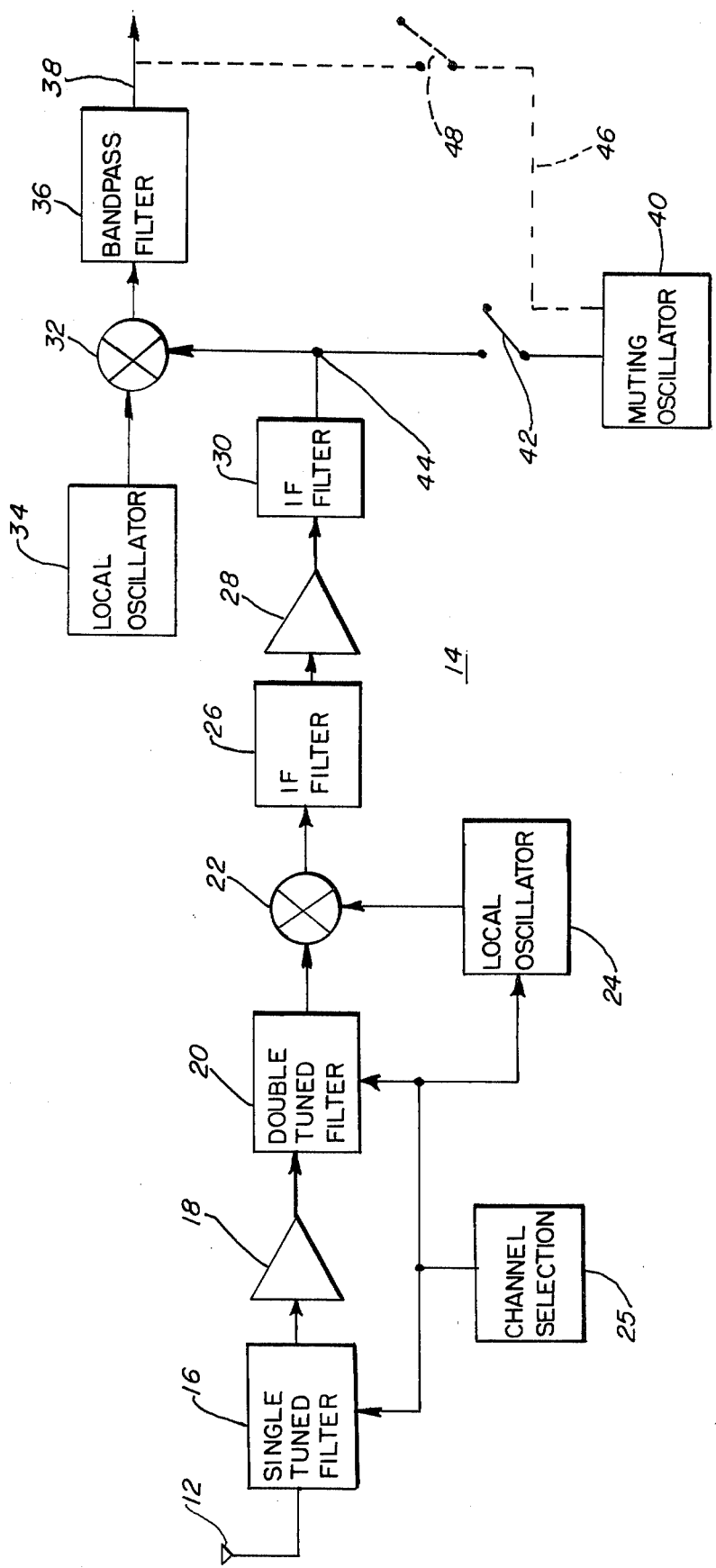
FIG. 1 is a block diagram generally illustrating the apparatus of the present invention.

Referring to the drawings, FIG. 1 illustrates a conventional cable television converter operable for translating a television signal received over a cable television channel to a channel, typically channel 3 or 4, usable by a conventional television receiver. In this regard, it is to be understood that while the principles of the present invention will be explained in connection with the converting device shown in FIG. 1, such is intended as exemplary only and should therefore not be taken to impose any unnecessary limitations on the invention. Thus, in general terms, the principles of the present invention are equally applicable to any radio frequency signal processing apparatus wherein an angle modulated carrier, the angle modulation being either of the frequency or phase type, is developed including conventional television receivers, cable television converters, subscription television decoders and the like.

With specific reference now to FIG. 1, the illustrated cable television converter comprises an antenna 12 supplying received cable television signals to a conventional super-herodyne television-type tuning system 14. Tuning system 14 comprises a single tuned RF input filter 16 whose output is connected through an RF amplifier 18 to the input of a double-tuned RF filter 20. The output of double tuned filter 20 is applied to a mixer 22 which mixes the received RF television signal with the output of a local oscillator 24 for developing an output intermediate frequency (IF) signal. Single tuned filter 16, double tuned filter 20 and local oscillator 24 are controlled by a channel selection device 25 such that each of a plurality of cable television channels may be converted to intermediate frequency signals having the same fixed frequencies. In particular, each received RF television signal is converted to a 45.75 MHz amplitude modulated picture IF carrier signal and a 41.25 MHz frequency modulated sound IF carrier signal. The IF signals are coupled through a first IF carrier signal. The IF signals are coupled through a first IF filter 26, an IF amplifer 28 and a second IF filter 30 to one input of a second mixer 32. Mixer 32 beats the IF output from filter 30 with a signal developed by a second local oscillator 34 for re-converting the IF signals to RF signals corresponding to either channel 3 or channel 4, which RF signals are then bandpass filtered by a filter 36 and developed as a channel 3 or 4 RF television signal on an output 38. The output RF signals are subsequently coupled to the antenna terminals of a conventional television receiver which will reproduce the video and audio signals when tuned to channel 3 or 4.

In connection with the foregoing description, it will be observed that the frequency modulated sound carrier is never converted to a baseband signal in the converter, the sound carrier being initially received as an RF signal, converted to a 41.25 MHz IF carrier and then reconverted to either a 65.75 MHz (channel 3) or a 71.75 MHz (channel 4) RF carrier. As a consequence, conventional sound muting techniques which typically operate in terms of baseband audio signals are not applicable to the converter shown in FIG. 1. Furthermore, while a sound trap operating either at the sound IF carrier frequency or the channel 3 or 4 sound RF carrier frequency may be provided in an attempt to selectively mute the sound signal, such a system has an inherent deficiency resulting in a quite undesirable effect. In particular, the FM detection circuits of conventional television receivers are known to produce an extremely noisy output signal when the receiver is supplied with an input signal having no sound carrier components. Therefore, if the sound carrier is trapped in the converter, only random noise will be supplied to the television receiver sound demodulation circuits which will consequently produce a noisy output sound signal.

Figure 1A:
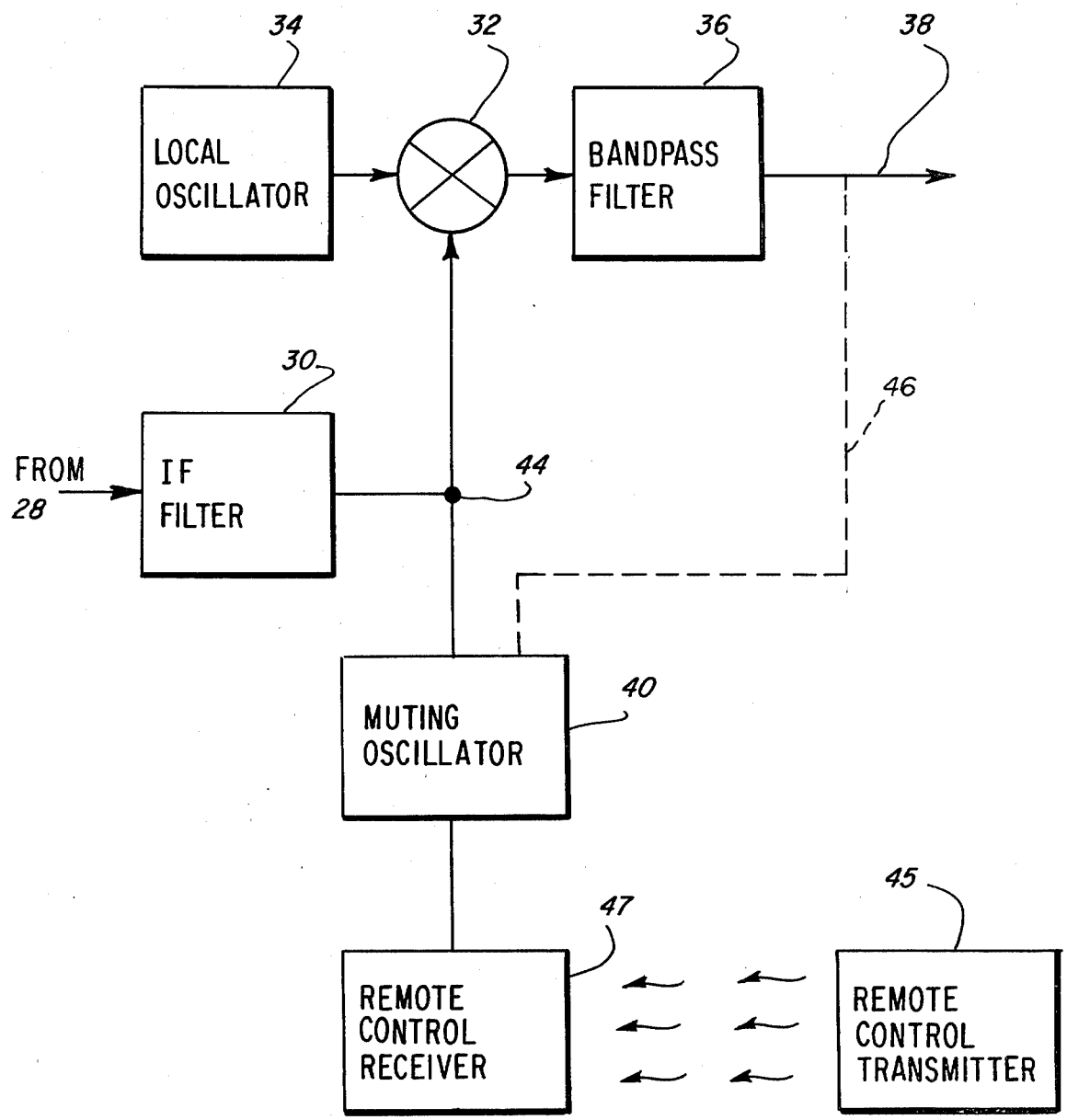
FIG. 1A is a block diagram illustrating an alternate embodiment of the apparatus of the invention.

The foregoing problems are ovecome in accordance with the present invention by applying the well known FM capture effect to achieve a remotely controllable sound muting capability in the converter circuit of FIG. 1. According to the FM capture effect, when two input signals are applied to an FM demodulator including a limiter, the input wave having the largest magnitude within the bandwidth of the demodulator controls the output. This principle or phenomenon is utilized in accordance with the present invention by injecting an unmodulated continuous wave (CW) signal at a suitable circuit node in the converter, the unmodulated CW signal being adapted for overriding or dominating the FM sound carrier when applied to the FM demodulator of a television receiver with the result that the sound is completely muted. For example, referring to FIG. 1, a muting oscillator 40 is coupled through a mute switch 42 to a circuit node 44 formed at the output of IF filter 30. When switch 42 is closed, muting oscillator 40 is adapted for coupling an unmodulated CW signal having a frequency of 41.25 MHz (the sound IF carrier frequency) to circuit node 44 whereby after conversion by mixer 32, both the unmodulated CW signal and the FM sound carrier are coupled to the FM demodulator of the television receiver. By designing the system such that the unmodulated CW signal is approximately 2-10 dB stronger than the FM sound carrier, the FM demodulator in the receiver will be controlled by the CW signal only and, since this signal carries no frequency modulation, a muted sound signal will result. In television receivers using intercarrier sound processing techniques, the muting signal produced by oscillator 40 is preferably maintained to a tolerance of about ±20 KHz. Also, the foregoing circuit may be conveniently realized in a remote control system in a variety of ways. For example, and for purposes of illustration only, muting oscillator 40 and switch 42 may be provided in a hand-held remote control unit which is connected to node 44 by a suitable length of conductor or by a wireless link in a manner similar to the technique normally used to remotely interface channel selection device 25 with the converter. Alternatively, the muting oscillator could be directly associated with the converter and enabled in response to a remotely generated control signal. This latter approach is illustrated in FIG. 1A wherein a remote control transmitter 45, which may comprise, for example, an infrared or ultrasonic transmission device, is selectively operable for transitting a sound muting control signal. The transmitted sound muting control signal is received by a remote control receiver 47 built into the converter, remote control receiver 47 being responsive to the received sound muting control signal for operating muting oscillator 40 for generating and coupling the unmodulated CW muting signal to circuit node 44.

It will be appreciated that the muting signal can be injected in the converter circuit at points other than at node 44. Thus, as indicated by dotted lines 46 of FIGS. 1 and 1A and dotted line switch 48 of FIG. 1, the unmodulated CW signal could be coupled to the RF output of the converter circuit. In this case, the unmodulated muting signal would have a frequency equal to either the channel 3 RF sound carrier (65.75 MHz) or the channel 4 RF sound carrier (71.75 MHz). Other than for this difference, the system operation is exactly as previously described.

Figure 2:
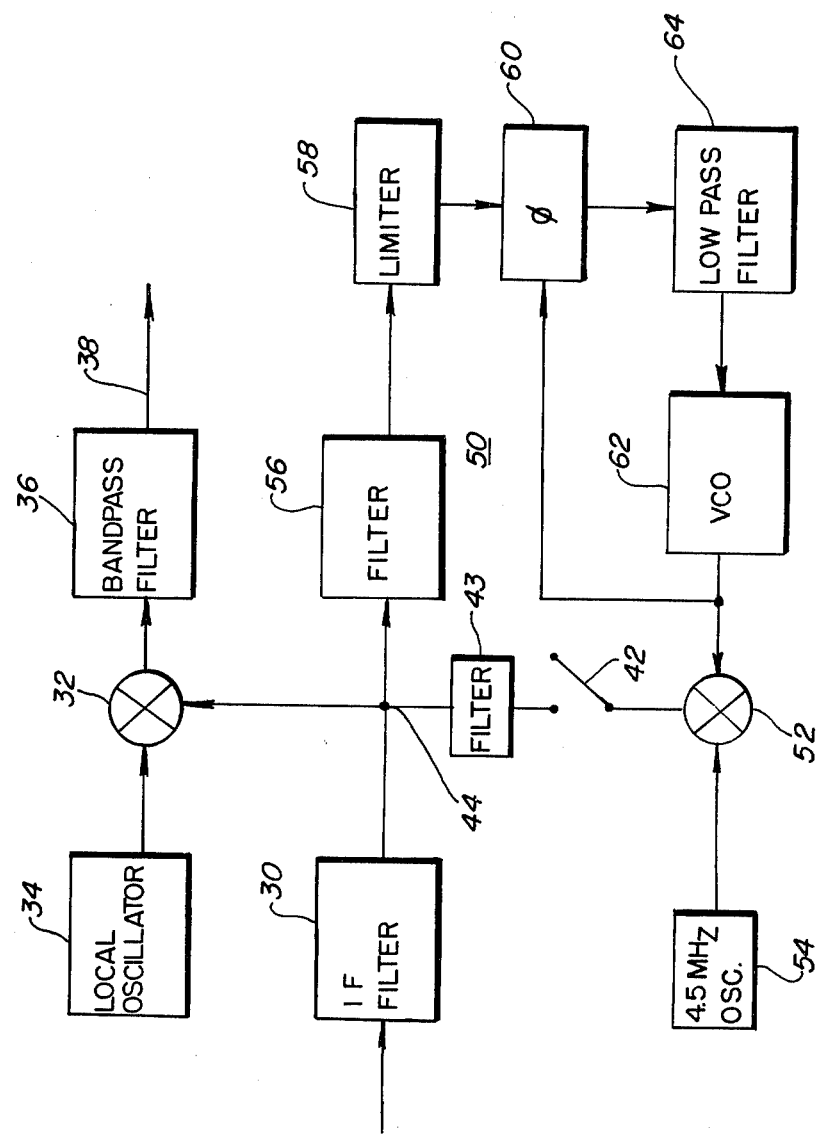
FIG. 2 is a block diagram illustrating another alternate embodiment of the apparatus of the invention.

FIG. 2 illustrates a method for generating the unmodulated muting signal using phase lock loop techniques. In particular, a phase lock loop 50 is provided for coupling an unmodulated 45.75 MHz CW signal to one input of a mixer 52, the other input of mixer 52 being provided with a 4.5 MHz signal from an oscillator 54. As a result, mixer 52 develops and couples an unmodulated 41.25 MHz muting signal through muting switch 42 and a filter 43 for application to circuit node 44. Phase lock loop 50 comprises a filter 56 adapted for coupling the relatively weak amplitude modulated picture IF carrier (45.75 MHz) to the input of an amplitude limiter 58. Limiter 58, in turn, couples the 45.75 MHz picture IF carrier to one input of a phase detector 60, the other input of phase detector 60 being derived from the output of a voltage controlled oscillator (VCO) 62. The error signal output of phase detector 60 is coupled through a low-pass filter 64 to the control input of VCO 62. Phase detector 60 is therefore operable for controlling VCO 62 through filter 64 for developing a relatively strong unmodulated 45.75 MHz signal which, as previously explained, is beat with the 4.5 MHz signal developed by oscillator 54 to form the muting signal at the output of mixer 52.

Figure 3:
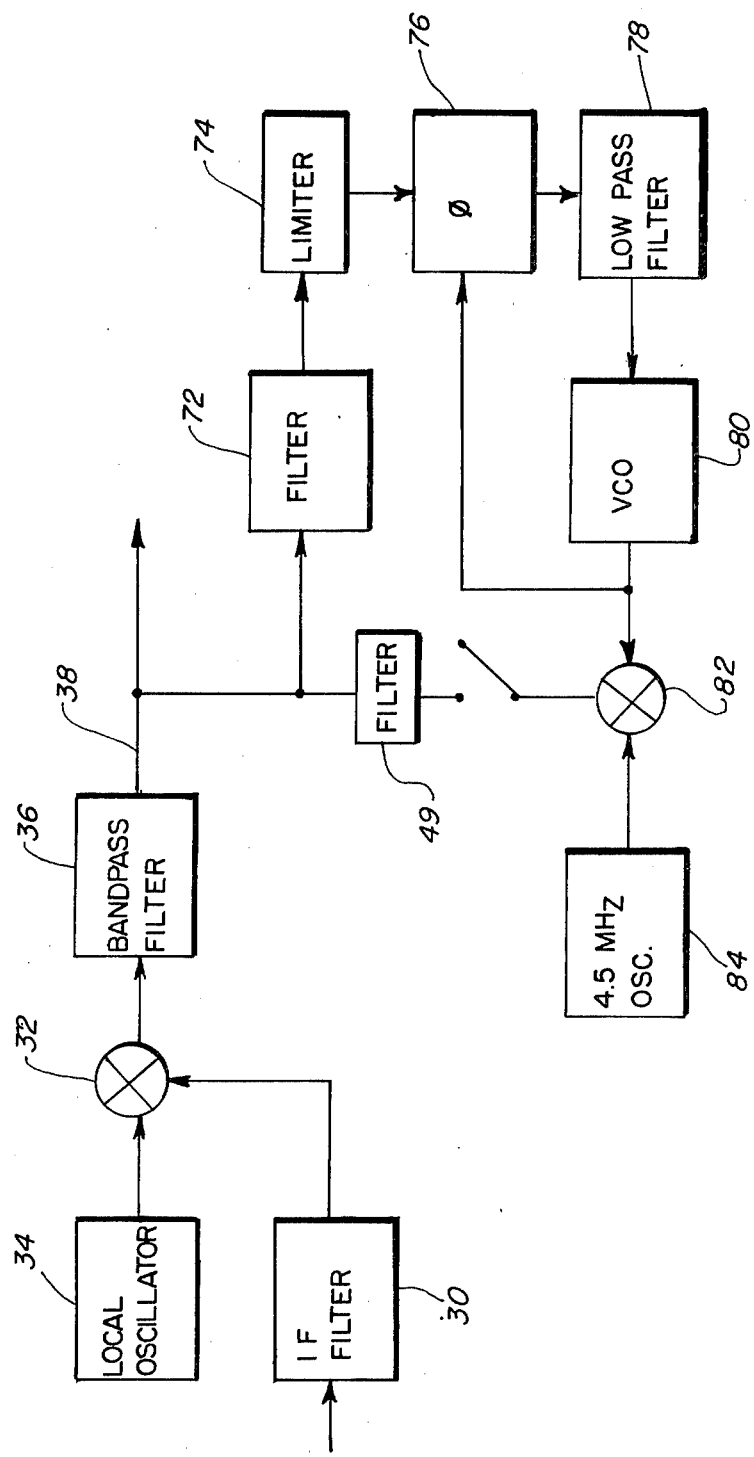
FIG. 3 is a block diagram illustrating a further embodiment of the apparatus of the invention.

FIG. 3 illustrates an adaptation of the circuit of FIG. 2 where the muting signal is injected into the RF output of the converter rather than into the IF signal path. Thus, the output amplitude modulated RF picture carrier, e.g. the channel 3 picture carrier at 61.25 MHz, developed on conductor 38 is coupled to a phase lock loop 70 through a filter 72. Phase lock loop 70 is identical to phase lock loop 50 and includes a limiter 74, a phase detector 76, a low pass filter 78 and a VCO 80. The output of VCO 80, which comprises a relatively strong unmodulated 61.25 MHz signal, is coupled to one input of a mixer 82, the other input to mixer 82 being derived from a 4.5 MHz oscillator 84. As a result, mixer 82 produces an unmodulated CW output muting signal at the frequency of the channel 3 RF sound carrier (65.75 MHz), the muting signal being selectively injected into the RF output signal through switch 48 and a filter 49. Of course, by appropriately changing the bandpass characteristics of filter 72, a similar result can be achieved where a channel 4 or, for that matter, any other channel signal, is developed on output conductor 38.

Figure 4:
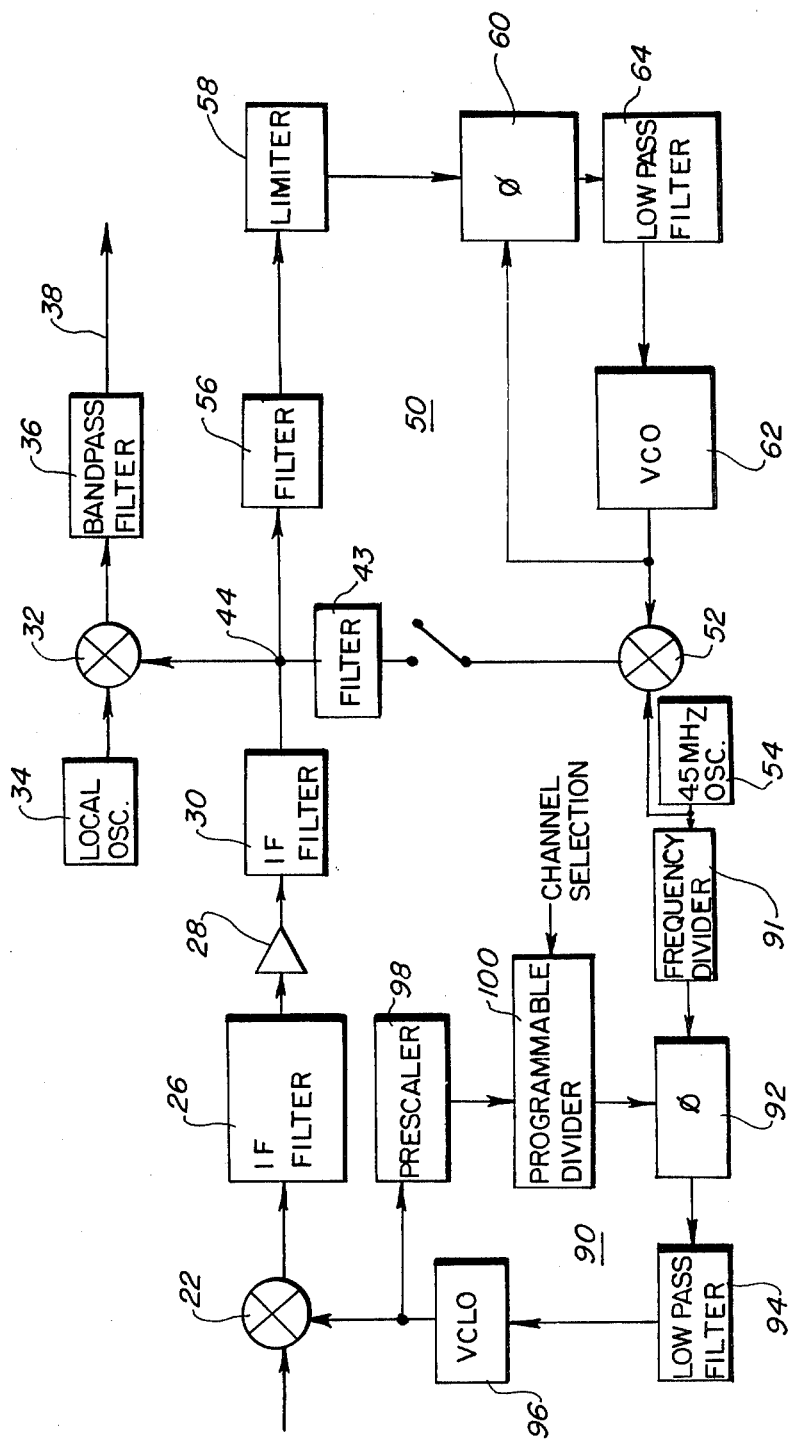
FIG. 4 is a block diagram illustrating yet another embodiment of the apparatus of the invention.

FIG. 4 illustrates a modification of the circuit of FIG. 2 where phase lock loop techniques are also used to generate the local oscillator signal coupled to mixer 22.

In this circuit, the same 4.5 MHz oscillator 54 supplying mixer 52 to generate the muting signal is used for supplying a reference signal for the tuning phase lock loop. More specifically, the output of the 4.5 MHz oscillator 54, after being applied through a frequency divider 91 which may be programmable, is coupled as a reference signal to one input of a phase detector 92 of a tuning phase lock loop 90. The error signal output of phase detector 92 is coupled through a low pass filter 94 to the control input of a voltage controlled local oscillator (VCLO) 96 whose output is supplied to mixer 22 and also fed-back through a prescaler 98 and a programmable divider 100 to the second input of phase detector 92. The division factor characterizing programmable divider 100 is controlled by the channel selection device such that the output of VCLO 96 is forced to a frequency appropriate for converting the received RF television signal to the proper IF frequencies. Also, it will be appreciated that the principles illustrated in FIG. 4 are equally applicable to the circuit of FIG. 3 where the muting signal is derived by phase lock loop 70 which is responsive to the RF output RF picture carrier of the converter.

While particular embodiments of the invention have been shown and described, it will be apparent that changes and modifications may be made therein without departing from the invention in its broader aspects. For example, it may be desirable in certain situations to employ the principles of the invention for muting a 4.5 MHz frequency modulated intercarrier audio signal by combining it with a suitable unmodulated 4.5 MHz CW muting signal. Also, it will be appreciated that the principles of the invention may be used in connection with various other types of radio frequency receivers and with phase modulated carriers as well as frequency modulated carriers. The aim of the appended claims, therefore, is to cover all such changes and modifications as fall within the true spirit and scope of the invention.

What is claimed is:

1. In a television signal frequency translating device having a circuit node developing a first non-baseband signal comprising a sound carrier signal frequency modulated in accordance with a baseband audio signal and a second non-baseband signal comprising a picture carrier signal amplitude modulated in accordance with a baseband video signal, said sound and picture carrier signals being offset from each other by 4.5 MHz, the improvement comprising:
   phase lock loop means responsive to said picture carrier signal for generating an unmodulated CW signal having a frequency substantially equal to the frequency of said picture carrier signal and an amplitude substantially greater than said sound carrier signal;
   means generating an unmodulated 4.5 MHz signal;
   means mixing said CW signal with said 4.5 MHz signal for developing a muting signal having a frequency substantially equal to the frequency of said sound carrier signal; and
   means operative for coupling said muting signal to said circuit node whereby said first non-baseband signal is dominated by said muting signal in accordance with the FM capture effect to facilitate muting of said baseband audio signal.

2. The improvement according to claim 1 wherein said television signal frequency translating device includes a tuning phase lock loop controlling a local oscillator for generating a local oscillator signal for translating the frequency spectrum of a received television signal from one frequency band to a second frequency band, said tuning phase look loop being responsive to a reference signal comprising said unmodulated 4.5 MHz signal.

3. A television signal frequency translating apparatus comprising:
   means for receiving a television signal broadcast over a first RF frequency band and including a video component comprising a modulated RF video carrier and an audio component comprising an RF sound carrier frequency modulated in accordance with a baseband audio signal;
   means for translating the frequency spectrum of said received television signal from said first frequency band to a second RF frequency band;
   means operable for generating a CW signal having a frequency substantially equal to the unmodulated frequency of said RF sound carrier in said second RF frequency band and having an amplitude substantially greater then the amplitude of said RF sound carrier in said second frequency band; and
   means disposed remotely from said television signal frequency translating apparatus for selectively operating said generating means for injecting said CW signal in said second RF frequency band for facilitating muting of said baseband audio signal without degrading the video component of said received television signal.

4. A television signal frequency translating apparatus according to claim 3 wherein said second RF frequency band comprises an intermediate frequency band characterized by a sound carrier having a frequency of about 41.25 MHz and wherein said generating means comprises means for generating a CW signal having a frequency substantially equal to 41.25 MHz and a signal strength at least about 2–10 db greater than said intermediate frequency sound carrier.

5. A television signal frequency translating apparatus according to claim 3 wherein said second RF frequency band comprises a selected television channel characterized by a sound carrier having a predetermined RF frequency and wherein said generating means comprises means generating a CW signal having a substantially fixed frequency equal to said predetermined frequency and a signal strength at least about 2–10 db greater than said sound carrier.

6. A television signal frequency translating apparatus comprising
   means for receiving a broadcast television signal including an FM sound carrier;
   means translating the frequency spectrum of said received television signal from one frequency band to a second frequency band;
   means for generating an unmodulated 4.5 MHz signal;
   phase lock loop means responsive to the picture carrier of said received television signal in said second frequency band for generating an unmodulated control signal having a frequency substantially equal to the frequency of said picture carrier;
   means for mixing said control signal with said 4.5 MHz signal for developing a CW signal having a frequency substantially equal to the frequency of said sound carrier in said second frequency band and an amplitude substantially greater than the amplitude of said sound carrier in said second frequency band; and means disposed remotely from said television signal frequency translating apparatus for selectively injecting said CW signal in said second frequency band for facilitating muting of said sound carrier.

7. A television signal frequency translating apparatus comprising:
- means for receiving a broadcast television signal including an FM sound carrier;
- means for generating an unmodulated 4.5 MHz signal;
- a tuning phase lock loop responsive to said 4.5 MHz signal for translating the frequency spectrum of said received television signal from one frequency band to a second frequency band;
- phase lock loop means responsive to the picture carrier of said received television in said second frequency band for generating an unmodulated control signal having a frequency substantially equal to the frequency of said picture carrier;
- means for mixing said control signal with said 4.5 MHz signal for developing a CW signal having a frequency substantially equal to the frequency of said sound carrier in said second frequency band and an amplitude substantially greater than the amplitude of said sound carrier in said second frequency band; and
- means disposed remotely from said television signal frequency translating apparatus for selectively injecting said CW signal in said second frequency band for facilitating muting of said sound carrier.

* * * * *